US009182922B2

(12) United States Patent
Diel et al.

(10) Patent No.: US 9,182,922 B2
(45) Date of Patent: Nov. 10, 2015

(54) DYNAMICALLY ADJUSTING WRITE PACING BY CALCULATING A PACING LEVEL AND THEN DELAYING WRITES FOR A FIRST CHANNEL COMMAND WORD (CCW) BASED ON PACING LEVEL

(71) Applicant: International Business Machines Corporation, Armonk, NY (US)

(72) Inventors: Eduard A. Diel, Tucson, AZ (US);
Matthew J. Kalos, Tucson, AZ (US);
Alan G. McClure, Sahuarita, AZ (US);
Carol S. Mellgren, Tucson, AZ (US);
Alfred E. Sanchez, Tucson, AZ (US);
David M. Shackelford, Tucson, AZ (US); Warren K. Stanley, Loveland, CO (US)

(73) Assignee: GLOBALFOUNDRIES, INC., Grand Cayman (KY)

( * ) Notice: Subject to any disclaimer, the term of this patent is extended or adjusted under 35 U.S.C. 154(b) by 73 days.

(21) Appl. No.: 14/024,240

(22) Filed: Sep. 11, 2013

(65) Prior Publication Data
US 2015/0074363 A1    Mar. 12, 2015

(51) Int. Cl.
*G06F 21/00* (2013.01)
*G06F 3/06* (2006.01)
*G06F 12/08* (2006.01)

(52) U.S. Cl.
CPC .............. *G06F 3/065* (2013.01); *G06F 3/0604* (2013.01); *G06F 3/0683* (2013.01); *G06F 12/0802* (2013.01)

(58) Field of Classification Search
USPC .................. 711/152, 167; 710/58
See application file for complete search history.

(56) References Cited

U.S. PATENT DOCUMENTS

| | | | |
|---|---|---|---|
| 5,623,599 A * | 4/1997 | Shomler | 714/18 |
| 5,926,834 A * | 7/1999 | Carlson et al. | 711/152 |
| 5,991,835 A * | 11/1999 | Mashimo et al. | 710/58 |
| 6,687,766 B1 * | 2/2004 | Casper et al. | 710/20 |
| 7,523,271 B2 | 4/2009 | Houzenga et al. | |
| 7,546,434 B2 * | 6/2009 | McClure et al. | 711/167 |
| 7,702,871 B1 * | 4/2010 | Arnon et al. | 711/167 |
| 8,032,581 B2 * | 10/2011 | Hathorn et al. | 709/201 |
| 2007/0185936 A1 * | 8/2007 | Derk et al. | 707/204 |
| 2009/0019443 A1 * | 1/2009 | Jakob | 718/102 |

FOREIGN PATENT DOCUMENTS

EP       2060973 A1      5/2009

* cited by examiner

*Primary Examiner* — Tammara Peyton
(74) *Attorney, Agent, or Firm* — Kunzler Law Group

(57) ABSTRACT

For dynamically adjusting write pacing, a calculation module calculates an interval as a maximum threshold for a primary volume divided by a first maximum pacing level for a first importance level. The calculation module further calculates a first pacing level as a number of record sets that have not been mirrored to a secondary volume divided by the interval. The first pacing level is set to the first maximum pacing level if the first pacing level is greater than the first maximum pacing level. The calculation module also selects a first pacing delay associated with the first pacing level from a delay table. A pacing module delays writes for a first channel command word writing to the primary volume by the first pacing delay.

20 Claims, 5 Drawing Sheets

DYNAMICALLY ADJUSTING WRITE PACING BY CALCULATING A PACING LEVEL AND THEN DELAYING WRITES FOR A FIRST CHANNEL COMMAND WORD (CCW) BASED ON PACING LEVEL

BACKGROUND

1. Field

The subject matter disclosed herein relates to writing pacing and more particularly relates to dynamically adjusting write pacing.

2. Description of the Related Art

Data is typically written to and read from a storage system. Writes to the storage system may be paced to allow other operations to complete.

BRIEF SUMMARY

A method for dynamically adjusting write pacing is disclosed. A calculation module calculates an interval as a maximum threshold for a primary volume of a primary storage subsystem divided by a first maximum pacing level for a first importance level. Writes to the primary volume are stored as record sets in a cache and mirrored to a secondary volume of a secondary storage subsystem. The calculation module further calculates a first pacing level as a number of record sets that have not been mirrored to the secondary volume divided by the interval. The first pacing level is set to the first maximum pacing level if the first pacing level is greater than the first maximum pacing level. The calculation module also selects a first pacing delay associated with the first pacing level from a delay table. A pacing module delays writes for a first channel command word writing to the primary volume by the first pacing delay. At least a portion of the calculation module and pacing module include one or more of hardware and program code. The program code is stored on one or more computer readable storage media. An apparatus and computer program product also perform the functions of the method.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
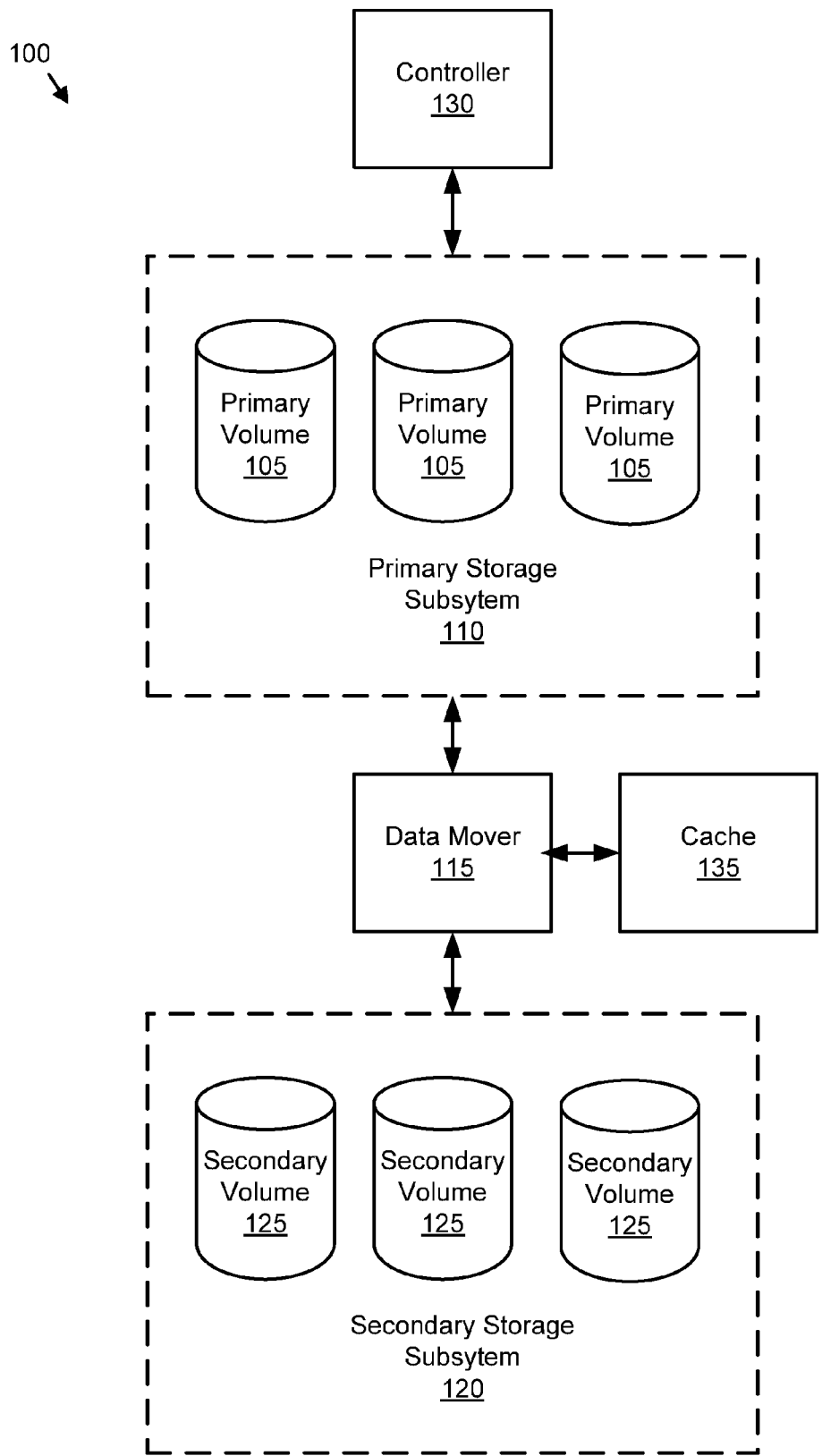
FIG. 1 is a schematic block diagram illustrating one embodiment of a storage system.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same computer program product via shared execution, transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the computer program product. The summed measurements of use units are periodically multiplied by unit costs and the resulting total computer program product service costs are alternatively sent to the customer and or indicated on a web site accessed by the customer which then remits payment to the service provider.

In one embodiment, the service provider requests payment directly from a customer account at a banking or financial institution. In another embodiment, if the service provider is also a customer of the customer that uses the computer program product, the payment owed to the service provider is reconciled to the payment owed by the service provider to minimize the transfer of payments.

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

In one embodiment, software applications and version numbers are identified and compared to the list of software applications and version numbers that have been tested to work with the computer program product. Those software applications that are missing or that do not match the correct version will be upgraded with the correct version numbers. Program instructions that pass parameters from the computer program product to the software applications will be checked to ensure the parameter lists match the parameter lists required by the computer program product. Conversely parameters passed by the software applications to the computer program product will be checked to ensure the parameters match the parameters required by the computer program product. The client and server operating systems including the network operating systems will be identified and compared to the list of operating systems, version numbers and network software that have been tested to work with the computer program product. Those operating systems, version numbers and network software that do not match the list of tested operating systems and version numbers will be upgraded on the clients and servers to the required level.

In response to determining that the software where the computer program product is to be deployed, is at the correct version level that has been tested to work with the computer program product, the integration is completed by installing the computer program product on the clients and servers.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The description of elements in each figure may refer to elements of proceeding figures. Like numbers refer to like elements in all figures, including alternate embodiments of like elements.

FIG. 1 is a schematic block diagram illustrating one embodiment of a storage system 100. The system 100 includes a controller 130, a primary storage subsystem 110, a data mover 115, and a secondary storage subsystem 120. In addition, the system 100 may include a cache 135. The primary storage subsystem 110 includes one or more primary volumes 105. The primary volumes 105 may be logical volumes, physical volumes, or combinations thereof. The secondary storage subsystem 120 includes one or more secondary volumes 125. The secondary volumes 125 may be logical volumes, physical volumes, or combinations thereof. The physical volumes may be hard disk drives, optical storage devices, micromechanical storage devices, holographic storage devices, semiconductor storage devices, or combinations thereof. The logical volumes may comprise portions of one or more physical volumes.

The controller 130 may be a primary controller. The controller 130 may read data from the primary storage subsystem 110. In addition, the controller 130 may write data to the primary storage subsystem 110. In one embodiment, a host (not shown) writes data through the controller 130 to one or more primary volumes 105 using a channel command word (CCW). The controller 130 may be in communication with the server farm, a network, a data center, and the like. The primary volumes 105 may be managed by a Z/OS® operating system manufactured by International Business Machines Corporation (IBM) of Armonk, N.Y. The Z/OS® operating system may be the Z/OS® operating system as of the filing date of the present application.

To protect the data stored on the primary storage subsystem 110 from loss, the data mover 115 may mirror the data to the secondary storage subsystem 120. The data mover 115 may be a Z/OS® GLOBAL MIRROR™ manufactured by IBM. The Z/OS® GLOBAL MIRROR™ may be the Z/OS® GLOBAL MIRROR™ as of the filing data of the present application. The data mover 115 maintains a consistent copy of the data on the secondary storage subsystem 120. A unit of data that is mirrored is referred to herein as a record set. One of skill in the art will recognize that other designations for a unit of data are equivalent to a record set. The data mover 115 may store a record set that is to be mirrored to the secondary storage subsystem 120 in the cache 135 until the record set can be written or mirrored to the secondary storage subsystem 120.

The data mover 115 mirrors the record sets concurrently with read and write operations by the controller 130 to the primary storage subsystem 110. In order for a consistent copy of the primary storage subsystem data to be maintained on the secondary storage subsystem 120, writes to the primary storage subsystem 110 may be delayed so that the data mover 115 does not fall behind in mirroring the primary storage subsystem data. Delaying writes is referred to herein as write pacing.

Unfortunately, finding the appropriate level of write pacing is difficult. If the delays in writing data to the primary storage subsystem 110 are too long, the performance of the primary storage subsystem 110 is significantly degraded. However, if the delays in writing data to the primary storage subsystem 110 are too short, the data mover 115 may be unable to maintain a consistent copy of the primary storage subsystem data on the secondary storage subsystem 120. The embodiments described herein dynamically adjust write pacing so that a consistent copy of the primary storage subsystem data may be maintained on the secondary storage subsystem 120 while minimizing the impact on the performance of the primary storage subsystem 110.

Figure 2:
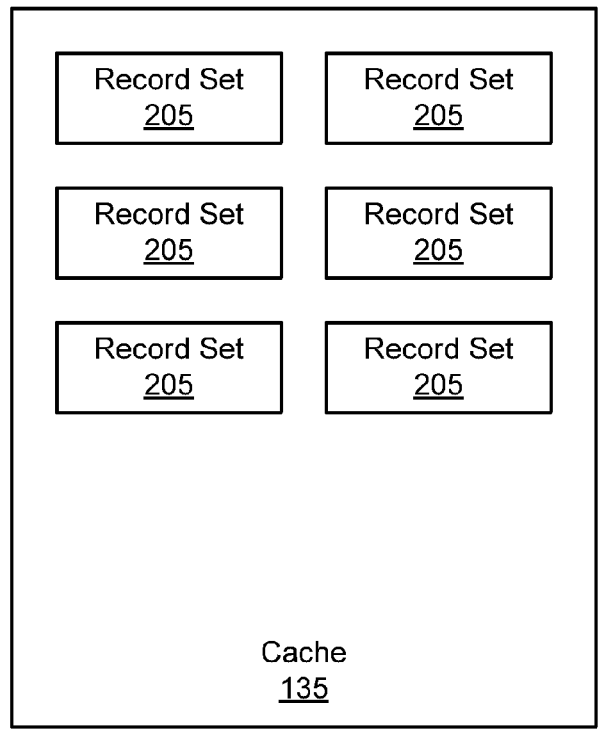
FIG. 2 is a schematic block diagram illustrating one embodiment of a cache.

FIG. 2 is a schematic block diagram illustrating one embodiment of the cache 135. The cache 135 is the cache 135 of FIG. 1. The cache 135 may be a semiconductor memory. The cache 135 stores one or more record sets 205. The cache 135 may have a finite storage capacity. As a result, the record sets 205 must be mirrored from the cache 135 to the secondary storage subsystem 120 in a timely manner before the storage capacity of the cache 135 is exceeded.

Figure 3:
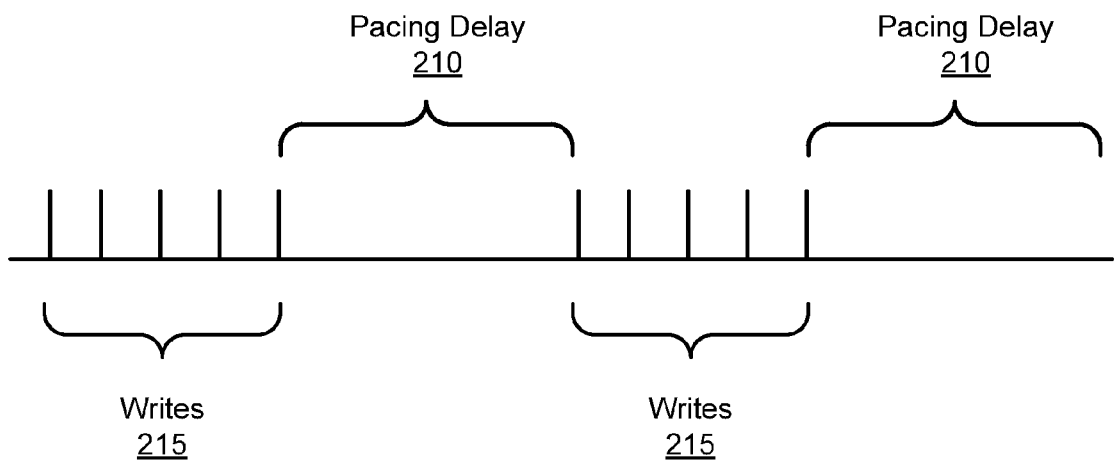
FIG. 3 is a schematic diagram illustrating one embodiment of writes and pacing delays.

FIG. 3 is a schematic diagram illustrating one embodiment of writes 215 and pacing delays 210. The writes 215 represent data being written to the primary storage subsystem 110 by the controller 130. Each write 215 must be mirrored to the secondary storage subsystem 120 to maintain a consistent copy of the primary storage subsystem data. As a result, the pacing delays 210 are generated to pause the writes 215 so that record sets 205 may be mirrored to the secondary storage subsystem 120. The controller 130 may generate the pacing delays 210. The embodiments described herein dynamically adjust the pacing delays 210 for write pacing so that a consistent copy of the primary storage subsystem data is maintained on the secondary storage subsystem 120 while minimizing the performance impact on access to the primary storage subsystem 110.

In one embodiment, a pacing delay 210 pauses writes 215 after a specified number of CCW operations. In an alternate embodiment, the pacing delay 210 pauses writes after a specified time interval of CCW operations.

Figure 4:
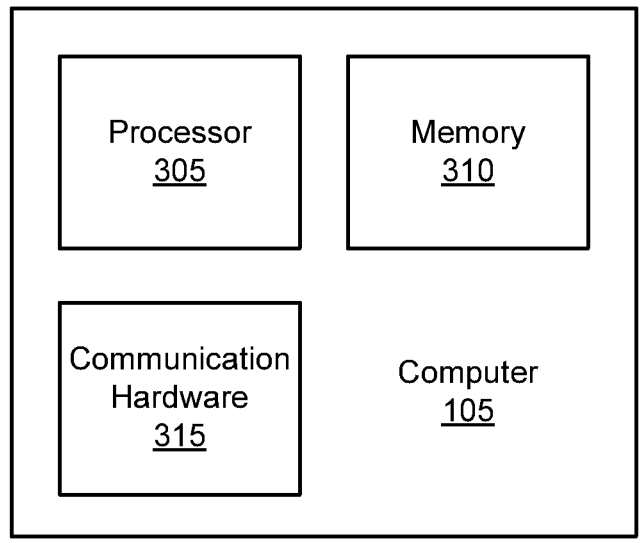
FIG. 4 is a schematic block diagram illustrating one embodiment of the computer.

FIG. 4 is a schematic block diagram illustrating one embodiment of the computer 105. The computer 105 may be the controller 130 and/or the data mover 115. The computer 105 includes a processor 305, a memory 310, and communication hardware 315. The memory 310 may be a computer readable storage medium such as a semiconductor storage device, a hard disk drive, a holographic storage device, a micromechanical storage device, or the like. The memory 310 may store program code. The processor 305 may execute the program code. The communication hardware 315 may communicate with other devices.

Figure 5:
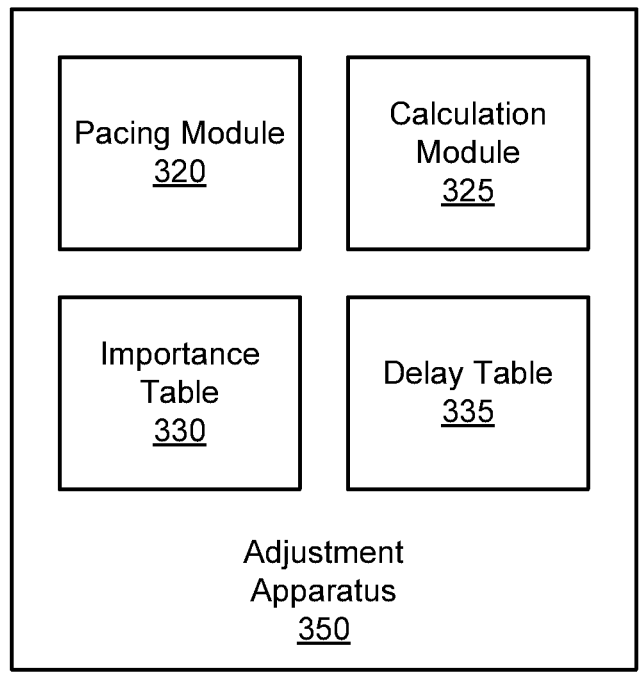
FIG. 5 is a schematic block diagram illustrating one embodiment of an adjustment apparatus.

FIG. 5 is a schematic block diagram illustrating one embodiment of an adjustment apparatus 350. The adjustment apparatus 350 may be embodied in the controller 130, the data mover 115, the host, or combinations thereof. The adjustment apparatus 350 includes a pacing module 320 and a calculation module 325. In addition, the adjustment apparatus 350 may include an importance table 330 and a delay table 335.

The pacing module 320 and the calculation module 325 may each comprise a computer readable storage medium such as the memory 310 storing program code. The program code may be executable by the processor 305 to perform the functions of the embodiments described herein.

The calculation module 325 may calculate an interval INT using equation 1 where T is a maximum threshold for a primary volume 105 of the primary storage subsystem 110 and MP1 is a first maximum pacing level for a first importance level I1.

$$INT = T/(MP1) \qquad \text{Equation 1}$$

In one embodiment, if the maximum pacing level is zero, the volume pacing level for the primary volume 105 is used. If the volume pacing level for the primary volume 105 is zero, a pacing level of zero is employed. The first maximum pacing level MP1 may be retrieved from the importance table 330 for a specified first importance level I1. Table 1 is exemplary of the importance table 330 associating maximum pacing levels MP with importance levels I, but is not limiting. One of skill in the art will recognize that the embodiments may be practiced with an importance table 330 with other values.

TABLE 1

| Importance (I) | Maximum Pacing Level (MP) |
|---|---|
| 1 | 1 |
| 2 | 3 |
| 3 | 5 |
| 4 | 7 |
| 5 | 9 |
| 6 | 11 |

In one embodiment, an importance level I is associated with each primary volume 105. The calculation module 325 further calculates a first pacing level PL1 using Equation 2, wherein SF is a number of record sets 205 that have not been mirrored to a secondary volume 125 and INT is the interval.

$$PL1 = SF/INT \qquad \text{Equation 2}$$

In one embodiment, the first pacing level PL1 is set to the first maximum pacing level MP1 if the first pacing level PL1 is greater than the first maximum pacing level MP1. The calculation module 325 further selects the first pacing delay 210 associated with the first pacing level PL1 from a delay table 335 that associates pacing levels PL with pacing delays 210. Table 2 illustrates one embodiment of the delay table 335. One of skill in the art will recognize that the embodiments may be practiced with other delay table values.

TABLE 2

| Pacing Level | Pacing Delay |
|---|---|
| 0 | 0 |
| 1 | 1 ms/50 writes |
| 2 | 1 ms/25 writes |
| 3 | 1 ms/10 writes |
| 4 | 1 ms/5 writes |
| 5 | 1 ms/2 writes |
| 6 | 1 ms |
| 7 | 2 ms |
| 8 | 5 ms |
| 9 | 10 ms |
| 10 | 25 ms |
| 11 | 50 ms |
| 12 | 100 ms |
| 13 | 250 ms |

The pacing delays 210 may be specified in milliseconds. Alternatively, the pacing delays 210 may be specified in microseconds, clock cycles, and the like. The pacing module 320 may delay writes 215 for an operation such as a CCW operation writing to a primary volume 105 by the first pacing delay 210. As a result, writes 215 are delayed by the pacing delay 210.

Figure 6:
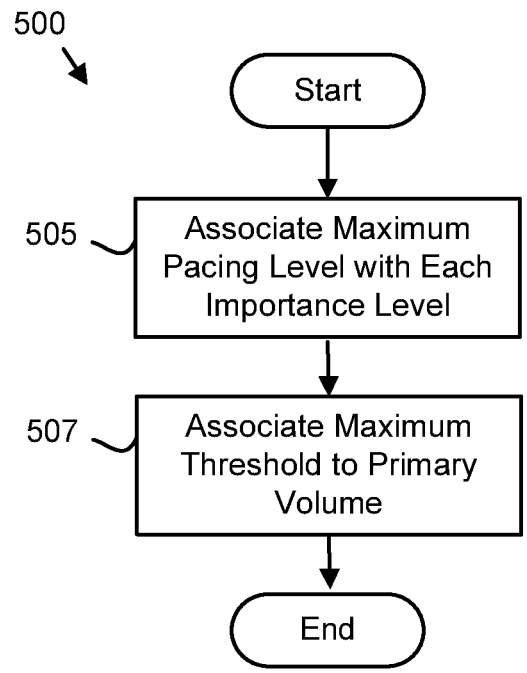
FIG. 6 is a schematic flow chart diagram illustrating one embodiment of a importance level initialization method.

FIG. 6 is a schematic flow chart diagram illustrating one embodiment of an importance level initialization method 500. The method 500 may be performed by the system 100 and apparatus 350. In one embodiment, the method 500 is performed by a computer readable storage medium storing program code. The program code may be executed by the processor 305 to perform the functions of the method 500.

The method starts, and in one embodiment the calculation module 325 associates 505 a maximum pacing level MP with each importance level I in the importance table 330. In one embodiment, the calculation module 325 employs a Set Session Characteristics (Defined Subsystem Operation) DSO to associate 505 a maximum pacing value MP with each importance level I. In one embodiment, a user may establish the maximum pacing value for each importance level. The data mover 115 may communicate the maximum pacing values and importance levels to the controller 130 via the Set Session Characteristics DSO. The calculation module 325 embodied in the controller 130 may calculate the importance level.

In one embodiment, an importance level I is calculated from a service level assigned to a workload. For example, a first workload may be assigned a service level of 1. The importance level may be calculated as 1 from the service level. Each primary volume 105 may have an importance level I. The importance level I and the maximum pacing levels MP may be defined by the administrator in PARMLIB and communicated to the calculation module 325 using an establish command for the data mover 115.

The calculation module 325 may further associate 507 a maximum threshold to each primary volume 105 and the method 500 ends. In one embodiment, the maximum threshold is specified by the administrator.

Figure 7:
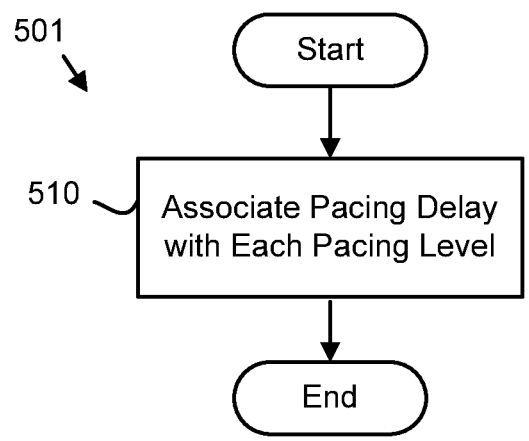
FIG. 7 is a schematic flow chart diagram illustrating one embodiment of a pacing level initialization method.

FIG. 7 is a schematic flow chart diagram illustrating one embodiment of a pacing level initialization method 501. The method 501 may be performed by the system 100 and apparatus 350. In one embodiment, the method 501 is performed by a computer readable storage medium storing program code. The program code may be executed by the processor 305 to perform the functions of the method 501.

The method 501 starts, and in one embodiment, the calculation module 325 associates 510 a pacing delay 210 with each pacing level PL in the delay table 335. In one embodiment, the pacing delay 210 is associated 510 with the pacing level PL using an initialization command.

Figure 8:
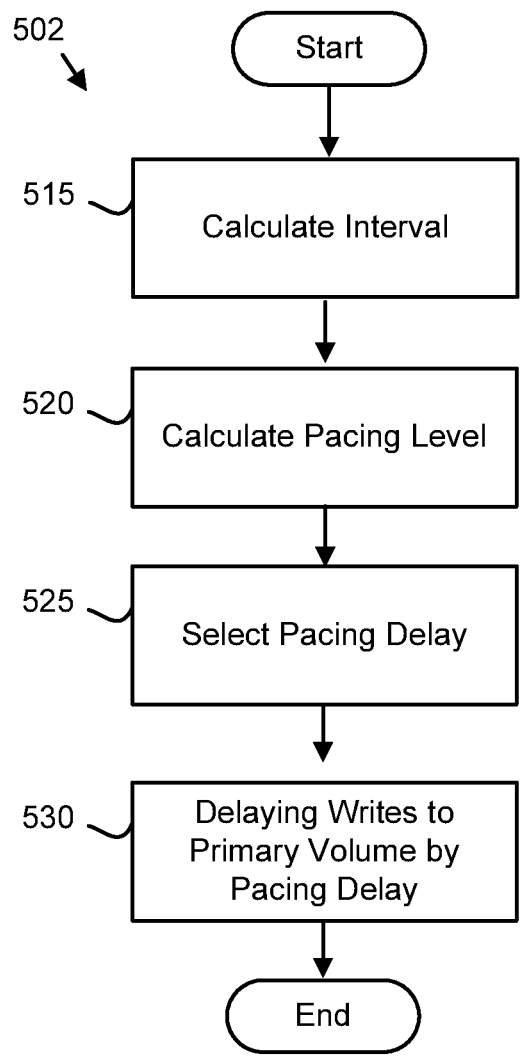
FIG. 8 is a schematic flowchart diagram illustrating one embodiment of a write pacing adjustment method.

FIG. 8 is a schematic flowchart diagram illustrating one embodiment of a write pacing adjustment method 502. The method 502 may be performed by the system 100 and apparatus 350. In one embodiment, the method 502 is performed by a computer readable storage medium storing program code. The program code may be executed by the processor 305 to perform the functions of the method 502.

The method 502 starts, and in one embodiment the calculation module 325 calculates 515 the interval INT using equation 1 where T is a maximum threshold for a primary volume 105 of the primary storage subsystem 110 and MP1 is a first maximum pacing level for a first importance level I1. The first maximum pacing level MP1 may be retrieved from an importance table 330 for a specified first importance level I1 of the primary volume 105 to which a write is directed.

The calculation module 325 further calculates 520 a first pacing level PL1 using Equation 2, wherein SF is a number of record sets 205 that have not been mirrored to a secondary volume 125 and INT is the interval. The first pacing level PL1 is set to the first maximum pacing level MP1 if the first pacing level PL1 is greater than the first maximum pacing level MP1.

The calculation module 325 further selects 525 the first pacing delay 210 associated with the first pacing level PL1 from the delay table 335 that associates pacing levels PL with pacing delays 210. The pacing module 320 may delay 530 writes for one or more CCW operations writing to a primary volume 105 by the first pacing delay 210 and the method 502 ends. As a result, writes 215 are delayed by the pacing delay 210.

By selecting a pacing delay 210 based on the calculations of the interval and the pacing level, the embodiments dynamically modify writing pacing so that a consistent copy of the primary storage subsystem data is maintained on the secondary storage subsystem 120 while minimizing performance degradation to the primary storage subsystem 110.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for dynamically adjusting write pacing comprising:

calculating, by use of a processor, an interval INT as a maximum threshold T for a primary volume of a primary storage subsystem divided by a first maximum pacing level MP1 for a first importance level, wherein INT=T/MP1 and writes to the primary volume are stored as record sets in a cache and mirrored to a secondary volume of a secondary storage subsystem;

calculating a first pacing level as a number of record sets that have not been mirrored to the secondary volume divided by the interval, wherein the first pacing level is set to the first maximum pacing level if the first pacing level is greater than the first maximum pacing level;

selecting a first pacing delay associated with the first pacing level from a delay table; and delaying writes for a first channel command word (CCW) writing to the primary volume by the first pacing delay.

2. The method of claim 1, further comprising associating a maximum pacing level with each of a plurality of importance levels.

3. The method of claim 2, wherein a set session characteristics define subsystem operation (DSO) associates the maximum pacing level with each of the plurality of importance levels.

4. The method of claim 1, wherein the primary volume is managed by a Z/OS® operating system.

5. The method of claim 4, wherein the record sets are mirrored to the secondary volume with a Z/OS® GLOBAL MIRROR™ data mover.

6. The method of claim 1, further comprising associating a pacing delay with each of a plurality of pacing levels.

7. The method of claim 1, further comprising associating the maximum threshold to the primary volume.

8. An apparatus comprising:
a calculation module calculating an interval INT as a maximum threshold T for a primary volume of a primary storage subsystem divided by a first maximum pacing level MP1 for a first importance level, wherein INT=T/MP1 and writes toto the primary volume are stored as record sets in a cache and mirrored to a secondary volume of a secondary storage subsystem, calculating a first pacing level as a number of record sets that have not been mirrored to the secondary volume divided by the interval, wherein the first pacing level is set to the first maximum pacing level if the first pacing level is greater than the first maximum pacing level, and selecting a first pacing delay associated with the first pacing level from a delay table;
a pacing module delaying writes for a first channel command word (CCW) writing to the primary volume by the first pacing delay; and
wherein at least a portion of the calculation module and the pacing module comprise one or more of hardware and program code, the program code stored on one or more computer readable storage media.

9. The apparatus of claim 8, further comprising associating a maximum pacing level with each of a plurality of importance levels.

10. The apparatus of claim 9, wherein a set session characteristics define subsystem operation (DSO) associates the maximum pacing level with each of the plurality of importance levels.

11. The apparatus of claim 8, further comprising associating a pacing delay with each of a plurality of pacing levels.

12. The apparatus of claim 8, further comprising associating the maximum threshold to the primary volume.

13. A computer program product for dynamically adjusting write pacing, the computer program product comprising a computer readable storage medium having program code embodied therein, the program code readable/executable by a processor to:
calculate an interval INT as a maximum threshold T for a primary volume of a primary storage subsystem divided by a first maximum pacing level for a first importance level MP1, wherein INT=T/MP1 and writes to the primary volume are stored as record sets in a cache and mirrored to a secondary volume of a secondary storage subsystem;
calculate a first pacing level as a number of record sets that have not been mirrored to the secondary volume divided by the interval, wherein the first pacing level is set to the first maximum pacing level if the first pacing level is greater than the first maximum pacing level;
select a first pacing delay associated with the first pacing level from a delay table; and
delay writes for a first channel command word (CCW) writing to the primary volume by the first pacing delay.

14. The computer program product of claim 13, further comprising associating a maximum pacing level MP with each of a plurality of importance levels.

15. The computer program product of claim 14, wherein a set session characteristics define subsystem operation (DSO) associates the maximum pacing level with each of the plurality of importance levels.

16. The computer program product of claim 13, wherein the primary volume is managed by a Z/OS® operating system.

17. The computer program product of claim 13, wherein the record sets are mirrored to the secondary volume with a Z/OS® GLOBAL MIRROR™ data mover.

18. The computer program product of claim 13, further comprising associating a pacing delay with each of a plurality of pacing levels.

19. The computer program product of claim 13, further comprising associating the maximum threshold to the primary volume.

20. A method for integrating a computer program product, comprising integrating program code into a computing system, wherein the code in combination with the computing system performs the following:
calculating an interval INT as a maximum threshold T for a primary volume of a primary storage subsystem divided by a first maximum pacing level MP1 for a first importance level, wherein INT=T/MP1 and writes to the primary volume are stored as record sets in a cache and mirrored to a secondary volume of a secondary storage subsystem;
calculating a first pacing level as a number of record sets that have not been mirrored to the secondary volume divided by the interval, wherein the first pacing level is set to the first maximum pacing level if the first pacing level is greater than the first maximum pacing level;
selecting a first pacing delay associated with the first pacing level from a delay table; and
delaying writes for a first channel command word (CCW) writing to the primary volume by the first pacing delay.

* * * * *